United States Patent
Need (10) Patent No.: US 7,093,034 B2
(45) Date of Patent: Aug. 15, 2006

(54) METHOD AND APPARATUS FOR INPUT MANAGEMENT HAVING A PLURALITY OF INPUT PROVIDER TYPES WHEREIN STAGING AREA HOLDS AND ALLOWS ACCESS BY EXTERNAL COMPONENTS

(75) Inventor: Dwayne Need, Woodinville, WA (US)

(73) Assignee: Microsoft Corporation, Redmond, WA (US)

( * ) Notice: Subject to any disclaimer, the term of this patent is extended or adjusted under 35 U.S.C. 154(b) by 209 days.

(21) Appl. No.: 10/714,979

(22) Filed: Nov. 18, 2003

(65) Prior Publication Data

US 2005/0108439 A1 May 19, 2005

(51) Int. Cl.
*G06F 9/46* (2006.01)
*G06F 3/00* (2006.01)

(52) U.S. Cl. .............. 710/33; 710/1; 710/31; 709/237; 719/318

(58) Field of Classification Search .............. 710/1, 710/31, 33; 709/237; 719/318
See application file for complete search history.

(56) References Cited

U.S. PATENT DOCUMENTS 6,049,832 A * 4/2000 Brim et al. .............. 709/237

* cited by examiner

*Primary Examiner*—Tammara Peyton
(74) *Attorney, Agent, or Firm*—Shook, Hardy & Bacon LLP (57) ABSTRACT

The present invention is directed to a method and system for use in a computing environment for managing input information. The system for facilitating input management in a computerized environment may include an input manager for processing events received from an input provider. The system may additionally include a staging area including a stack of events created by the input manager. The staging area allows access by external components. The external components may include a set of filters capable of accessing and manipulating the stack of input events and a set of monitors capable of monitoring manipulation of the stack of events.

22 Claims, 4 Drawing Sheets

METHOD AND APPARATUS FOR INPUT MANAGEMENT HAVING A PLURALITY OF INPUT PROVIDER TYPES WHEREIN STAGING AREA HOLDS AND ALLOWS ACCESS BY EXTERNAL COMPONENTS

CROSS-REFERENCE TO RELATED APPLICATIONS

None

STATEMENT REGARDING FEDERALLY SPONSORED RESEARCH OR DEVELOPMENT

None.

TECHNICAL FIELD

Embodiments of the present invention relate to the field of input management and input processing in computing environments. More particularly, embodiments of the invention are directed to a system and method for managing and processing input from unknown input devices and for facilitating third party input processing.

BACKGROUND OF THE INVENTION

It is often necessary to process different types of input information in the context of computing environments. In recent years, the number and types of input devices available to computer users have increased. Operating systems have typically been configured to accommodate specific input devices. The use of unknown input devices presents new obstacles since applications and operating systems may not understand the new input devices.

Furthermore, in the field of assistive technologies (AT), it is often necessary to allow external components to access input information and collect user interface (UI) information. AT products exist to help computer users who have a need for assistance in areas of learning, communication, and access to information contained in and presented by computer software and have a need for information relevant to the computer interface. These products generally need outside support to gather information about an application's user interface, discover and interrogate UI elements, generate keyboard and pointer input, and to understand what type of behavior or functionality is currently available. Furthermore, current infrastructures are not extensible and therefore require operating system level changes to add new functionality.

Accordingly, a solution is needed that will facilitate the addition of input devices required by third parties without the need for operating system revisions. Additionally, a solution is needed that will make these new devices as functional within the system as built-in devices. The solution should further expose the internal processing of input events so that third parties can intervene and modify processing to suit their needs. Another goal is to accommodate a third party to support devices that are not recognized by allowing them to plug into the input processing mechanism in the same manner that the system does.

BRIEF SUMMARY OF THE INVENTION

Embodiments of the present invention are directed to a system for facilitating input management in a computerized environment. The system includes an input manager for processing events received from an input provider. The input manager creates a staging area. The staging area allows access by external components.

In one aspect, the invention is directed to a system for facilitating input management in a computerized environment. The system includes a staging area including a stack of input events. The system also includes a set of filters capable of accessing and manipulating the stack of input events and a set of monitors capable of monitoring manipulation of the stack of events.

In a further aspect, the invention is directed to a method for managing input to facilitate third party access. The method includes processing input events by creating a staging area. The method may additionally include providing third party access to the staging area to enable a third party to monitor events in the staging area.

In yet an additional aspect, the invention is directed to a method for facilitating input management in a computerized environment. The method may include operating a staging area including a stack of input events and accessing and manipulating the stack of input events in the staging area using at least one filter. The method may further include monitoring manipulation of the stack of events in the staging area using at least one monitor.

BRIEF DESCRIPTION OF THE DRAWINGS

The present invention is described in detail below with reference to the attached drawings figures, wherein.

DETAILED DESCRIPTION OF THE INVENTION

System Overview

Figure 1:
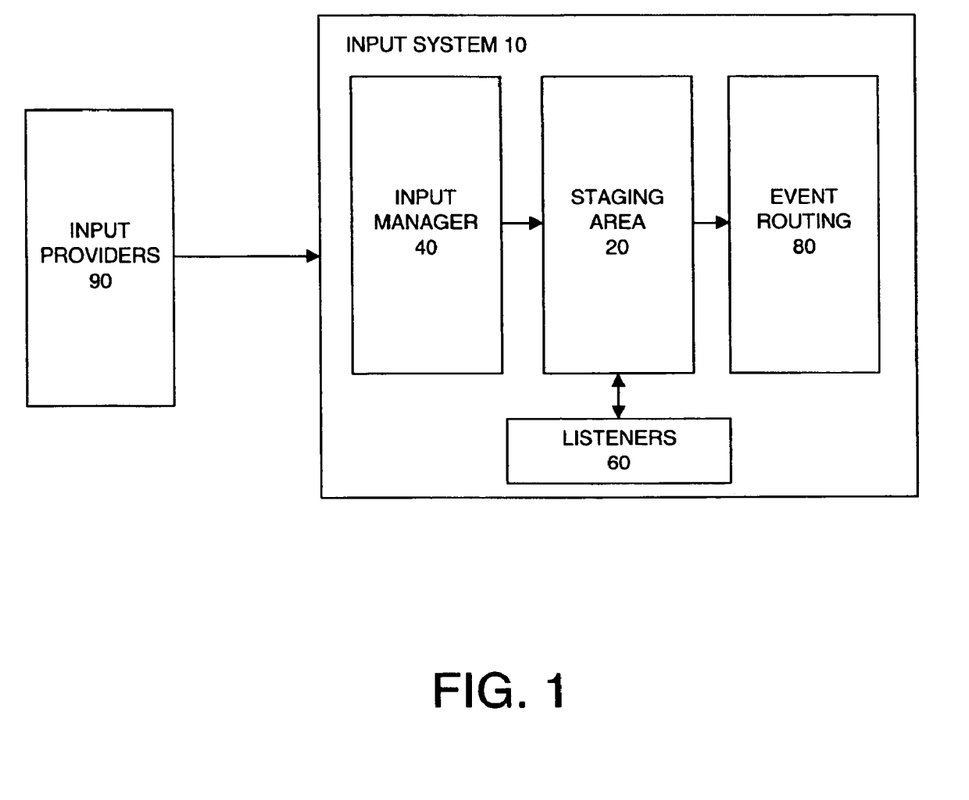
FIG. 1 is a block diagram illustrating components of a system for managing input information in accordance with en embodiment of the invention.

Embodiments of the present invention are directed to a system and method for managing input information. As illustrated in FIG. 1, an input system 10 may include an input manager 40, a staging area 20, listeners 60 (also known as event handlers), and an event routing area 80. The input system 10 may receive information from input providers 90. The composition and functions of these components are further described below. The input system 10 may be associated with a computer operating system and may function in conjunction with a computerized environment such as that shown and described below with reference to FIG. 5.

Exemplary Operating Environment

Figure 5:
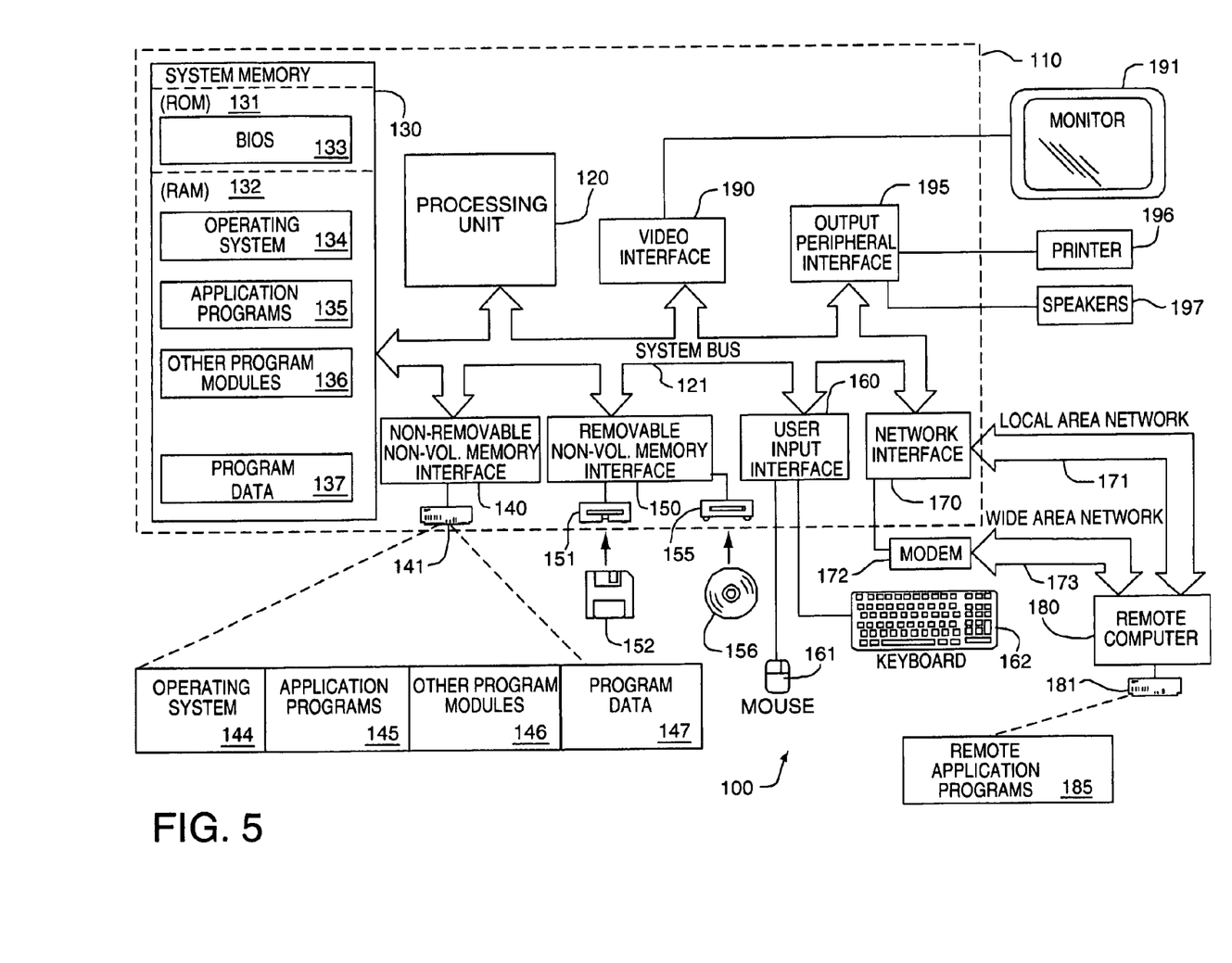
FIG. 5 is an exemplary computing environment in which the present invention may be practiced.

FIG. 5 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 5, the exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 5 illustrates operating system 134, application programs 135, other program modules 136, and program data 137.

The computer 110 may also include other removable/nonremovable, volatile/nonvolatile computer storage media. By way of example only, FIG. 5 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 5, provide storage of computer readable instructions, data structures, program modules and other data for the computer 110. In FIG. 5, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition-to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 5. The logical connections depicted in FIG. 5 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 5 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Input Management System

As set forth above, FIG. 1 illustrates an input system 10 that may include an input manager 40, a staging area 20, listeners 60, (also known as event handlers) and an event routing area 80. The input system 10 may receive information from input providers 90.

Figure 2:
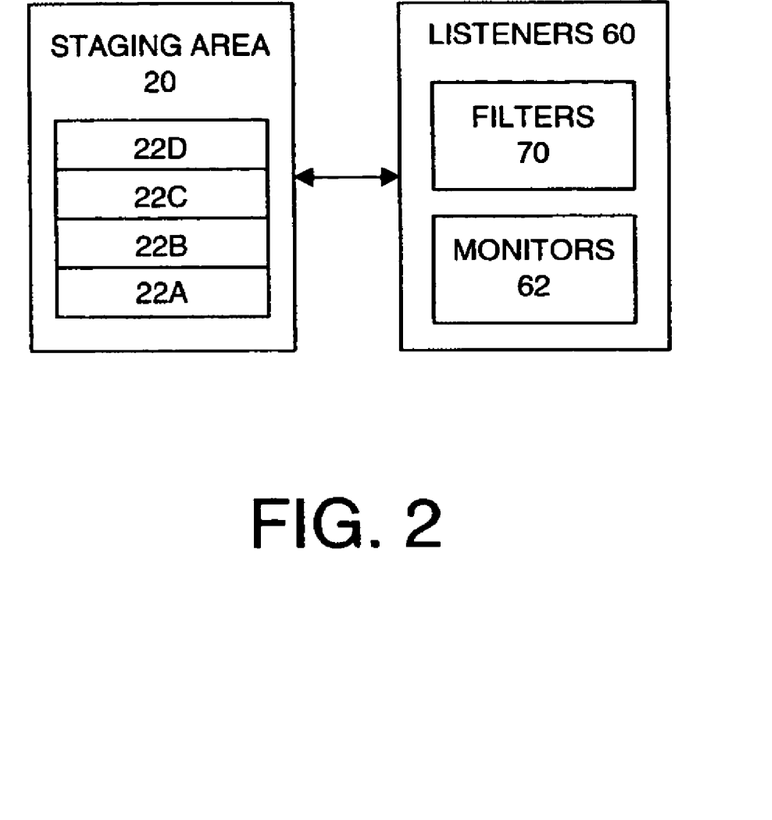
FIG. 2 is a block diagram illustrating further details of a system in accordance with an embodiment of the invention.
Figure 3:
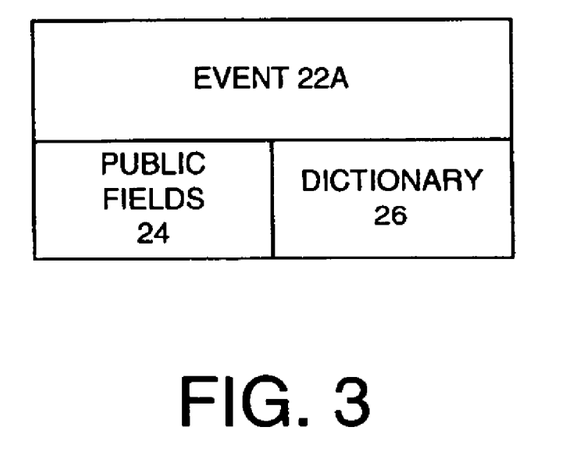
FIG. 3 is a block diagram illustrating further details of a system in accordance with an embodiment of the invention.

FIG. 2 illustrates communication between the staging area 20 and the listeners 60 within the input system 10. The staging area 20 includes a stack 22 of events illustrated by 22a, 22b, 22c, and 22d. The input manager 40 constructs the stack 22 as will be further explained below. Listeners 60 may include monitors 62 and filters 70. FIG. 3 illustrates an event 22*a* having public fields 24 that are accessible to the listeners 60. A dictionary 26 may be appended to each event by the input manager 40 and may also be accessible to the listeners 60.

Input Providers

Input providers 90 take input from external input technology such as Win32™ hwnds, which direct user input to an appropriate Avalon™ application or more specifically to the input manager 40. (Avalon and Win32 are trademarks of the Microsoft Corporation of Redmond Wash.). The input manager 40 ultimately directs the input to the staging area 20. Input providers 90 must be registered with the input manager and can include a plurality of providers for different types of input that provide input reports to the input manager 20. For example, at least a mouse input provider and a keyboard input provider are typically registered with the input manager 40.

An example of an input report provided by an input provider 90 is provided below in Table 1.

TABLE 1

```
class System.Windows.Input.InputReport : Object
{
  public InputMode get_Mode( )
  public DateTime get_Timestamp( )
  public InputType get_Type( )
}
class System.Windows.Input.InputReportEventArgs : InputEventArgs : RoutedEventArgs : EventArgs : Object
{
  public InputReport get_Report( )
  protected virtual Void InvokeEventHandler(Delegate genericHandler, Object genericTarget)
}
class sealed System.Windows.Input.InputReportEventHandler : MulticastDelegate : Delegate : Object
  Implements: ICloneable ISerializable
{
  public virtual IAsyncResult BeginInvoke(Object sender.InputReportEventArgs e. AsyncCallback callback, Object object)
  public virtual Void EndInvoke(IAsyncResult result)
  public virtual Void Invoke(Object sender. InputReportEventArgs e)
}
enum sealed System.Windows.Input.InputType : Enum : ValueType : Object
  Implements: IComparable IFormattable IConvertible
{
    public InputType HID
    public InputType Keyboard
    public InputType Mouse
    public InputType Stylus
}
enum sealed System.Windows.Input.RawKeyboardActions : Enum : ValueType : Object
  Implements: IComparable IFormattable IConvertible
{
    public RawKeyboardActions Activate
    public RawKeyboardActions AttributesChanged
    public RawKeyboardActions Deactivate
    public RawKeyboardActions KeyDown
    public RawKeyboardActions KeyUp
}
class System.Windows.Input.RawKeyboardInputReport : InputReport : Object
{
  public RawKeyboardActions get_Actions( )
  public IntPtr get_ExtraInformation( )
  public Int32 get_ScanCode( )
  public Int32 get_VirtualKey( )
}
enum sealed System.Windows.Input.RawMouseActions : Enum : ValueType : Object
  Implements: IComparable IFormattable IConvertible
{
    public RawMouseActions AbsoluteMove
    public RawMouseActions Activate
    public RawMouseActions AttributesChanged
    public RawMouseActions Button1Press
    public RawMouseActions Button1Release
    public RawMouseActions Button2Press
    public RawMouseActions Button2Release
    public RawMouseActions Button3Press
    public RawMouseActions Button3Release
    public RawMouseActions Button4Press
    public RawMouseActions Button4Release
    public RawMouseActions Button5Press
    public RawMouseActions Button5Release
    public RawMouseActions Deactivate
    public RawMouseActions HorizontalWheelRotate
    public RawMouseActions RelativeMove
    public RawMouseActions VerticalWheelRotate
    public RawMouseActions VirtualDesktopMove
}
```

TABLE 1-continued

```
class System.Windows.Input.RawMouseInputReport : InputReport : Object
{
  public RawMouseActions get_Actions( )
  public IntPtr get_ExtraInformation( )
  public VisualManager get_VisualManager( )
  public Int32 get_Wheel( )
  public Int32 get_X( )
  public Int32 get_Y( )
}
class System.Windows.Input.StagingAreaInputItem : Object
{
  public InputEventArgs get_Input( )
  public Object GetData(Object key)
  public Void SetData(Object key, Object value)
}
class sealed System.Windows.Input.TextManager : UIContextObject : Object
{
    public readonlyRoutedEventID PreviewTextInputEventID
    public readonlyRoutedEventID TextInputEventID
```

Input Manager

The input manager 40 maintains the stack 22. The input manager 40 is capable of surfacing four public events including: (1) a pre-process input event; (2) a pre-notify input event; (3) a post-notify input event; and (4) a post-process input event The pre-process input event is an event raised at the beginning of an input loop that processes each input event. Any event handler accessing this event will be a filter 70. The filters 70 can use the arguments passed to it to manipulate the stack 22 and the dictionary 26 associated with the each event in the stack The filters 70 can perform operations including "cancel", "push input", "pop input", "peek input", "get data", and "set data" by accessing the pre-process input event.

The pre-notify input event is raised after the filters 70 have agreed on processing of an input event. An event handler listening to this event will be a monitor 62. The monitor 62 observes the input event being processed. In some instances, the monitor may be able to manipulate the dictionary 26 via arguments passed to it, to allow for operations such as "get data" and "set data".

The post-notify input event is raised after the input event has been routed. Any event handler listening to this event will be a monitor 62. The monitor 62 observes the input event being processed. In some instances, the monitor may be able to manipulate the dictionary 26 via arguments passed to it, to allow for operations such as "get data" and "set data".

The post-process input event is raised at the end of the loop that processes each input event. Any event handler listening to this event is a filter 70. The filters 70 can perform operations including "cancel", "push input", "pop input", "peek input", "get data", and "set data" by accessing the post-process input event.

An exemplary input manager class is provided below in Table 2.

TABLE 2

```
class sealed System.Windows.Input.InputManager : UIContextObject : Object
{
  public InputManager get_Current( )
  public ICollection get_InputProviders( )
  public KeyboardDevice get_PrimaryKeyboardDevice( )
```

TABLE 2-continued

```
  public MouseDevice get_PrimaryMouseDevice( )
  public InputProviderSite RegisterInputProvider(IInputProvider
inputProvider)
    public readonlyRoutedEventID InputReportEventID
    public readonlyRoutedEventID PreviewInputReportEventID
      public event PreProcessInputEventHandler PreProcessInput;
      public event NotifyInputEventHandler PreNotifyInput;
      public event NotifyInputEventHandler PostNotifyInput;
      public event ProcessInputEventHandler PostProcessInput;
  public InputDeviceMouseRecentInputDevice {get;}
}
```

When an input report is provided to the input manager 40, it is placed on the stack 22 along with a marker to indicate the end of the input sequence. Next, the input manager 40 enters a loop where it pops off the next input from the top of the stack 22, raises the "pre" events, dispatches the input by raising the event on the appropriate element, and finally raises the "post" events. The loop terminates when the end of the input sequence is discovered.

The input manager 40 first raises the pre-process input event. Listeners 60 to this event such as filters 70, monitors 62 can access the staging area 20 and the dictionary 26 through the pre-process input event arguments that are passed along. Filters 70 can also cancel the processing for the current event. After all listeners 60 are invoked, the input manager 40 may determine if processing for the event was canceled. If processing has been canceled, the input manager 40 starts the loop again with the next input. Otherwise, the input manager 40 raises the pre-notify input event, raises the input event being processed on the element and then calls the post-notify input event. Listeners 60 to the notification events can access the dictionary 26 through "NotifyInputEvents" arguments that are passed along. Finally, the input manager 40 raises the post-process input event.

Listeners 60 to this event can access the staging area 20 and the dictionary 26 through "ProcessingInput Event" arguments that are passed along. Handlers for various events are invoked in reverse order to how they were added, which allows application developers to override system behavior. The input manager 40 may maintain the last input device for which input was processed. In this manner, a user interface can be customized to be more appropriate to the most recently used device.

Staging Area

The input manager 40 processes one raw input report at a time and constructs the stack 22 to create the staging area 20. In staging area 20, filters 70 may manipulate events 22a–d and can turn one input event into several input events (e.g., "mouse move" can become "mouse leave", "mouse answer", "mouse move"). Monitors 62 also have access to the staging area 20, but cannot modify the stack 22. The staging area 20 enables third party intervention to facilitate gathering of UI information and addition of unknown input devices.

Listeners to Staging Area

Listeners (or event handlers) 60 to the staging area generally include both filters 70 and monitors 62. Filters 70 may include any code that listens to the pre-process input events or post-process input events. As set forth above, filters 70 can modify the staging area 20. Filters 70 can cancel pre-process input events, thus removing the input events from the stack 22. The post-process input events expose the stack 22 and enable the filters 70 to pop events from the stack 22 or push events onto the stack 22. The filters 70 can manipulate the stack by pushing on new events, popping off existing events, and changing the public fields of existing events. The input system 10 preferably may include at least a mouse filter, a keyboard filter, and a stylus filter, and may additionally include user-defined filters.

Monitors 62 may include any code that listens to pre-notify input events or post-notify input events. Monitors 62 cannot modify the staging area. Monitors 62 are useful for input management because it is possible for a first filter to process an item, and for another filter to throw the same item away. Such conflicts can be addressed by calling a monitor after all the filters have argued about the contents of the staging area 20. Any global state that needs updating (such as the position of the mouse, the state of various keys on the keyboard, etc.) needs to be done with a monitor 62. The input system 10 preferably may include at least a mouse monitor, a keyboard monitor, and a stylus monitor, and may additionally include user-defined monitors.

Dictionary

Each event 22a–22d in the staging area 20 includes an associated dictionary 26. The dictionary 26 can be used by filters 70 and monitors 62 and stores the state of each event.

In an exemplary embodiment, when an input device is implemented, for example, when a mouse moves over an element, that element receives a "mouse enter" event.

When the mouse moves away from an element, that element receives a "mouse leave" event. When the mouse moves, it might both leave the old element and enter the new element as events since a filter 70 may watch for mouse related events and push new events into the staging area 20 for "mouse leave" and "mouse enter". Each stack event includes an associated dictionary 26 that stores the element that the events were acting on. Later, during processing of the "mouse enter" or "mouse leave" events, the dictionary 26 supplies the element to allow processing to continue.

In an additional example, the dictionary 60 may store a mouse position. Mouse moves are typically measured in pixel units. The input manager 40 may convert the pixel units to higher precision internal units and store the results in the dictionary 26 for the "mouse move" event. Further processing of the "mouse move" event extracts the position in internal units from the dictionary 26.

Event Routing

The input system 10 uses the event routing module 80 to give notifications to relevant elements. Routing is the process of informing multiple elements about what happened, until one of the elements marks the event as handled. Events use one of three routing mechanisms including: (1) direct only (aka "no routing"); (2) tunneling; and (3) bubbling. Direct-only means only the target element is notified. Bubbling works up the element tree by first notifying a target element, then the target element's parent, then the parent element's parent, etc. Tunneling is the opposite process, starting at the root of the element tree and working down, ending with the target element. Input events may occur in pairs. For example, a tunneling event may be followed by a bubbling event.

Input Devices

Input can be divided into the categories of logical and physical input. Additional input layers may also be provided. Logical input includes such components as "mouse" and "keyboard" APIs and provides an abstraction of available physical input. Logical input can combine multiple physical devices into a single logical experience. For example, two physical mice manipulate a single logical mouse position. Logical input is an idealized version of hardware. Input devices such as pointer and logical keyboard may be simplified to what all computers are likely to provide. For example, the pointer input class may have only two buttons.

A visible mouse cursor on a display screen can be connected with either a physical mouse or a logical mouse. Although the visible mouse cursor is more commonly connected with the logical mouse, there are some accessibility scenarios in which the mouse cursor should not reflect input the application is receiving. These scenarios may require adding an extra level of indirection between the device and the application. In the accessibility community, an aid for people with poor motor skills may need to smooth out or reinterpret mouse movement before sending it to applications. Such an aid might even need the visual indicator of the cursor position to be different from where the application thinks the mouse is. In these cases, the visible mouse cursor may be connected with the physical mouse. Each distinct physical mouse can have its own settings, such as sensitivity and acceleration settings.

A physical input layer facilitates the addition of new input devices. Physical devices are exposed through interfaces and a logical input event can point to the physical device. For example, a physical mouse interface can be used to represent the mouse actually attached to the computer. The physical mouse interface should provide access to the full richness of the mouse, including buttons that aren't available on all devices. If multiple mice are attached to the computer, multiple physical mouse interfaces may be used. Each physical device would receive its own mouse object.

An element class may be provided for defining input-related properties, methods, and events. An exemplary embodiment of an element class is provided in Table 3 below.

TABLE 3

```
class Element
  {
      // Mouse
      event MouseButtonEventHandler MouseLeftButtonDown;
      event MouseButtonEventHandler MouseLeftButtonUp;
      event MouseButtonEventHandler MouseRightButtonDown;
      event MouseButtonEventHandler MouseRightButtonUp;
```

TABLE 3-continued

```
    event MouseEventHandler MouseMove;
    bool IsMouseOver { get; }
    bool IsMouseDirectlyOver { get; }
    event MouseEventHandler MouseEnter;
    event MouseEventHandler MouseLeave;
    event MouseEventHandler GotMouseCapture;
    event MouseEventHandler LostMouseCapture;
    bool IsMouseCaptured { get; }
    bool CaptureMouse( );
    void ReleaseMouseCapture( );
    event MouseEventHandler MouseHover;
    event MouseWheelEventHandler MouseWheel;
    // Keyboard
    event KeyEventHandler KeyDown;
    event KeyEventHandler KeyUp;
    event TextInputEventHandler TextInput;
    bool IsFocused { get; }
    bool Focus( );
    event FocusChangedEventHandler GotFocus;
    event FocusChangedEventHandler LostFocus;
    bool Focusable { get; set; }
    bool IsFocusWithin { get; }
    bool KeyboardActive { get; set; }
    bool IsEnabled { get; }
}
```

Input devices may be represented by classes as shown below. Table 4 shows an exemplary keyboard class. Table 5 illustrates an exemplary mouse class and Table 6 illustrates an exemplary stylus class.

TABLE 4

```
class Keyboard
{
    static Element Focused { get; }
    static bool Focus(Element elt)
    static ModifierKeys Modifiers { get; }
    static bool IsKeyDown(Key key)
    static bool IsKeyUp(Key key)
    static bool IsKeyToggled(Key key)
    static KeyState GetKeyState(Key key)
    static KeyboardDevice PrimaryDevice { get; }
}
```

TABLE 5

```
class Mouse
{
    static Element DirectlyOver { get; }
    static Element Captured { get; }
    static bool Capture(Element elt);
    static Cursor OverrideCursor { get; set; }
    static bool SetCursor(Cursor cursor);
    static MouseButtonState LeftButton { get; }
    static MouseButtonState RightButton { get; }
    static MouseButtonState MiddleButton { get; }
    static MouseButtonState XButton1 { get; }
    static MouseButtonState XButton2 { get; }
    static Point GetPosition(Element relativeTo);
    static void Synchronize(bool force);
    static MouseDevice PrimaryDevice { get; }
    static void AddAnyButtonDown(Element element,
        MouseButtonEventHandler handler);
    static void RemoveAnyButtonDown(Element element,
        MouseButtonEventHandler handler);
}
```

TABLE 6

```
// stylus APIs on Element
    event StylusEventHandler StylusDown;
    event StylusEventHandler StylusUp;
    event StylusEventHandler StylusMove;
    event StylusEventHandler StylusInAirMove;
    bool IsStylusOver { get; }
    bool IsStylusDirectlyOver { get; }
    event StylusEventHandler StylusEnter;
    event StylusEventHandler StylusLeave;
    event StylusEventHandler StylusInRange;
    event StylusEventHandler StylusOutOfRange;
    event StylusSystemGestureEventHandler StylusSystemGesture;
    event StylusEventHandler GotStylusCapture;
    event StylusEventHandler LostStylusCapture;
    bool IsStylusCaptured { get; }
    bool CaptureStylus( )
    void ReleaseStylusCapture( )
```

The stylus is pen input, made popular by the Tablet PC. The operating system can treat the stylus as a mouse, using mouse APIs. However, in an exemplary embodiment, the input management system 10 also exposes stylus interfaces just as keyboard and mouse interfaces. The stylus is also capable of acting as a mouse, so that applications that only know about mice also get some level of stylus support automatically. When the stylus is used in such a manner, the relevant application first gets the appropriate stylus event, then it gets the corresponding mouse event. In this instance, the stylus event is "promoted" to a mouse event. The concept of promotion is further described below.

Adding New Devices/Promotion

In order to add new input devices, a device driver can be written for the new device. Promotion is defined as pushing a secondary event in response to a primary event with the purpose of providing higher-level information. The dictionary of the primary event is inherited by the secondary event.

A promoter turns physical input into logical input. Devices that drive logical input (simulate mouse or keyboard) will typically provide two closely coordinated promoters, an internal promoter and an external promoter. The internal promoter works within the application process, and uses internal APIs such as the input filters 70. The external promoter lives outside the process (typically one per desktop or session), and talks to external APIs, such as Win32™ APIs.

The promoter should then be registered with the input manager 40. Furthermore, the application can often partially configure promotion. For example, the stylus device driver may provide APIs for determining whether "press and hold" creates a pointer right click.

In some instances, the device may be required to drive internal Avalon™ applications unaware of its existence. In this situation, only an internal promoter need be written to promote events from the new device to a known form of event. In other situations, the device will be required to operate with unaware external applications (such as Win32™ applications). In this instance, an external promoter may be needed to coordinate with the internal promoter. Physical and logical input events must be correctly synchronized and promotion policy interfaces must be respected. One preferred approach is to ignore logical input that came from the external promoter, and let the internal promoter do all promotion.

Device drivers should be created with the capability to resolve hardware idiosyncrasies. For example, in some cases one mouse may appear different from another and the device driver will make them look similar. However, in some cases, the software above the device driver layer will not understand the new device. The most straightforward case is when the new device does not interact with existing device categories in any way, shape, or form.

As an example, a joystick could represent a newly introduced device that does not interact with a keyboard or mouse. Moving the joystick doesn't move the cursor or generate keystrokes, and applications will need to listen to joystick-specific APIs, not keyboard or mouse APIs.

In the presently introduced input management system, the device author or creator of the joystick device category would be enabled to provide APIs for dealing with joystick input. The APIs would include the necessary properties, methods, and events, packaged similarly to the keyboard, mouse, and stylus. The device author would write an input provider as explained above and use filters and monitors to integrate into the input management system 40.

Alternatively, the device author could choose some other mechanism entirely, such as direct communication with the device driver. In some instances, it may be preferable for a new device to simulate existing device categories so it can work with applications that don't understand the new device. As set forth above, many applications don't directly understand the stylus, so stylus events are promoted to mouse events. At the same time, the original stylus information needs to be available to applications that do understand styluses. Additionally, a single application can have some components that understand the new device, and other components that don't. A second challenge is that the device author typically needs some level of "input promotion" for external applications such as Win32™ applications as well as internal Avalon™ applications.

Table 7 below illustrates an example of a promoter its registration with the input manager 40.

TABLE 7

```
class PointerPromoter {
    void Press(button, bool handled);
    void Release(button, bool handled);
    void Move(x, y, bool handled); // x&y relative to top-level window
}
class InputManager {
    void RegisterPointerPromoter(PointerPromoter promoter);
    void RegisterKeyboardPromoter(PointerPromoter promoter);
}
```

The "Handled" property indicates whether the event will be marked as handled before it is even raised. A handled event is still routed, and element can listen to it by listening to all events (handled or otherwise). "Generated" events such as PointerEnter/PointerLeave are always raised as unhandled.

Method

Figure 4:
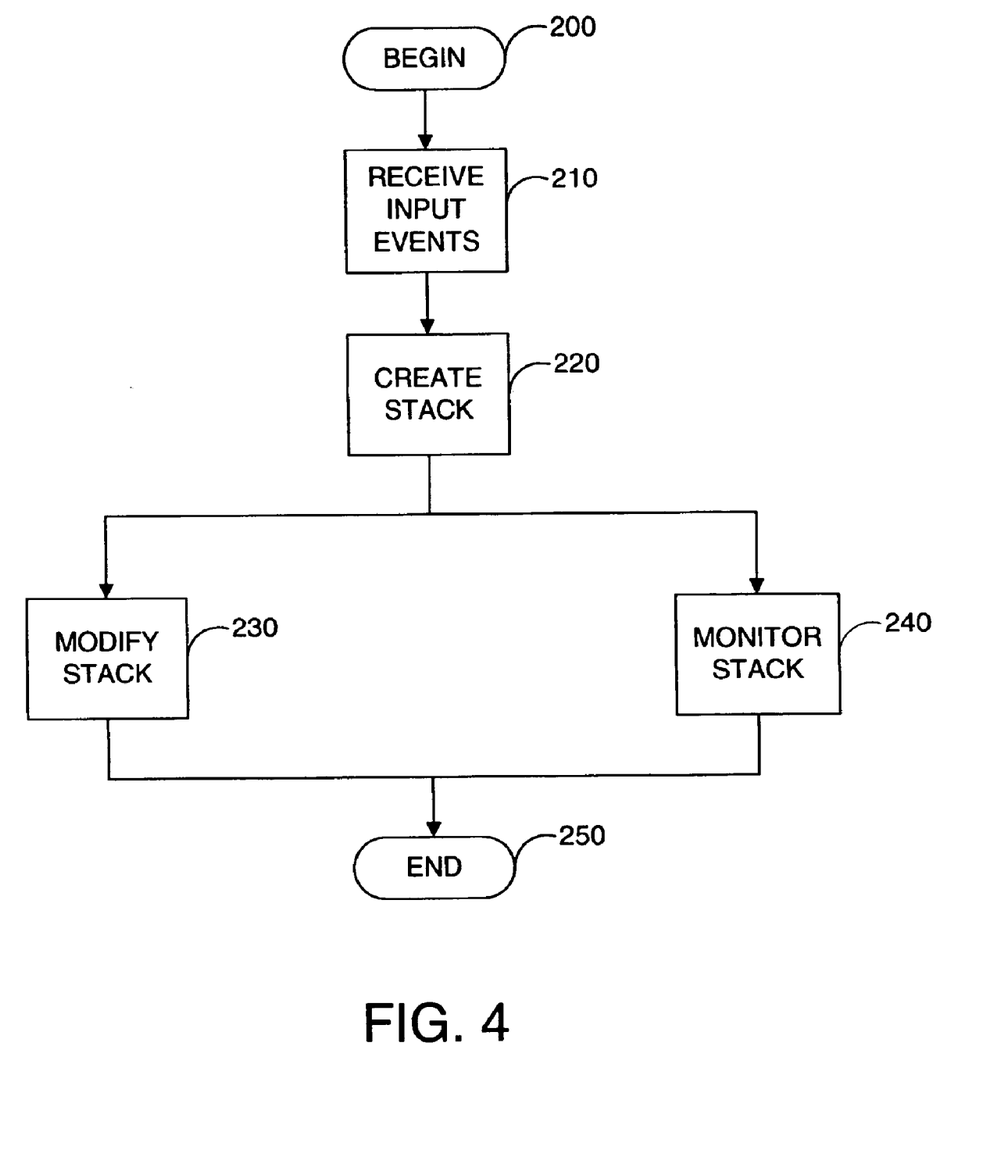
FIG. 4 is a flow chart illustrating a method for managing input information in accordance with an embodiment of the invention.

FIG. 4 illustrates a method 200 for managing input in accordance with an embodiment of the invention. In step 210, the input manager 40 receives input events from input providers 90. In step 220, the input manager 40 creates a stack of input events in the staging area 20. In step 230, filters 70 are able to modify the stack 22 and event processing within the stack. In step 240, monitors 62 monitor the status of the events within the stack 22. These steps occur substantially as described above with respect to each component of the system.

Before the input manager receives input events in step 210, the input provider 90 notifies its corresponding input provider site about available input report. The site tells the input manager 40. The input providers for keyboard and mouse may get their input from a Win32™ user by way of an HwndSource. Other devices can choose to do the same, or can choose an entirely different mechanism.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set for above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A system for facilitating input management in a computerized environment, the system comprising:
    an input manager for processing events received from at least two input providers, wherein the input providers are registered with the input manager and the input providers provide input reports to the input manager for different types of input;
    a staging area for holding events processed by the input manager and allowing access by external components; and
    a promoter for promoting an event associated with a first registered input provider to an event associated with a second registered input provider.

2. The system of claim 1, wherein the staging area comprises a stack of events created by the input manager.

3. The system of claim 1, further comprising at least one filter for accessing the staging area, wherein the filters are configured to modify the staging area.

4. The system of claim 3, further comprising a mouse filter, a keyboard filter, and a stylus filter.

5. The system of claim 3, further comprising user-defined filters for facilitating use of unknown input devices.

6. The system of claim 3, further comprising at least one monitor for monitoring manipulation of events in the staging area.

7. The system of claim 6, further comprising a mouse monitor, a keyboard monitor, and a stylus monitor.

8. The system of claim 6, further comprising a user-defined monitor for association with an unknown input device.

9. The system of claim 1, wherein each event in the staging area includes a dictionary for storing a state associated with the event.

10. The system of claim 1, wherein the event associated with the second registered input provider inherits a dictionary associated with the event associated with the first registered input provider.

11. A system for facilitating input management in a computerized environment, the system comprising:
    an input manager to register at least two input providers;
    a staging area including a stack of input events generated in response to the input provider;
    a set of filters capable of accessing and manipulating the stack of input events;

a set of monitors capable of monitoring manipulation of the stack of events; and a promoter for promoting an event associated with a first registered input provider to an event associated with a second registered input provider.

12. The system of claim 11, further comprising an input management system for receiving input reports and transmitting the input reports to the staging area.

13. The system of claim 11, wherein the set of filters comprises a mouse filter, a keyboard filter, and a stylus filter.

14. The system of claim 11, wherein the set of filters comprises at least one user-defined filter.

15. The system of claim 11, wherein the set of monitors comprises a mouse monitor, a keyboard monitor, and a stylus monitor.

16. The system of claim 11, further comprising a dictionary associated with each event in the stack, wherein the dictionary stores and event state.

17. The system of claim 11, wherein the event associated with the second registered input provider includes a dictionary inherited from the event associated with the first registered input provider.

18. A method for facilitating input management in a computerized environment, the system comprising:

registering at least two input providers with a input manager;

operating a staging area including a stack of input events generated in response to the input provider;

accessing and manipulating the stack of input events using at least one filter;

monitoring manipulation of the stack of events using at least one monitor; and promoting at least one event associated with a first registered input provider to an event associated with a second registered input provider.

19. The method of claim 18, further comprising receiving an input report from the input provider and using in put report information to construct the stack.

20. The method of claim 18, further comprising storing a dictionary for each event in the stack, wherein each dictionary defines an event state.

21. A computer readable medium having computer executable instructions for performing the method of claim 18.

22. The method of claim 18, wherein the promoted event associated with the second input provider includes a dictionary inherited from the event associated with the first input provider.

* * * * *